United States Patent
Hao et al.

(10) Patent No.: US 7,957,272 B2
(45) Date of Patent: Jun. 7, 2011

(54) METHOD AND APPARATUS FOR COINCIDENCE COUNTING FOR ESTIMATING FLOW STATISTICS

(75) Inventors: Fang Hao, Morganville, NJ (US); Muralidharan Sampath Kodialam, Marlboro, NJ (US); Tirunell V. Lakshman, Morganville, NJ (US); Hui Zhang, New Brunswick, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 824 days.

(21) Appl. No.: 11/372,895

(22) Filed: Mar. 10, 2006

(65) Prior Publication Data

US 2007/0211635 A1 Sep. 13, 2007

(51) Int. Cl.
  *G01R 31/08* (2006.01)
(52) U.S. Cl. ......................................................... 370/229
(58) Field of Classification Search .................. 370/229, 370/235, 365, 352, 351; 493/3, 30, 35
See application file for complete search history.

(56) References Cited

U.S. PATENT DOCUMENTS

| | | | | |
|---|---|---|---|---|
| 5,687,279 | A * | 11/1997 | Matthews | 704/201 |
| 6,483,804 | B1 * | 11/2002 | Muller et al. | 370/230 |
| 6,862,621 | B2 * | 3/2005 | Takada et al. | 709/224 |
| 7,385,924 | B1 * | 6/2008 | Riddle | 370/235 |
| 7,577,736 | B1 * | 8/2009 | Ovenden | 709/224 |
| 2002/0141339 | A1 * | 10/2002 | Konuma | 370/229 |
| 2003/0172177 | A1 * | 9/2003 | Kersley et al. | 709/236 |
| 2004/0170159 | A1 * | 9/2004 | Kim et al. | 370/352 |
| 2005/0025055 | A1 * | 2/2005 | Jain et al. | 370/235 |
| 2005/0270984 | A1 | 12/2005 | Kodialam et al. | |
| 2005/0270985 | A1 | 12/2005 | Hao et al. | |
| 2008/0137540 | A1 * | 6/2008 | Botvich | 370/241 |
| 2008/0165689 | A9 * | 7/2008 | Davies et al. | 370/235 |

OTHER PUBLICATIONS

Fang Hao, Murali Kodialam, T.V. Lakshman, and Hui Zhang "Fast, Memory Efficient Traffic Estimation by Coincidence Counting," IEEE, Infocom vol. 3 Mar. 2005 pp. 2080-2090.*
M. Kodialam et al., "Runs bAsed Traffic Estimator (RATE): A Simple, Memory Efficient Scheme for Per-Flow Rate Estimation," 2004 IEEE, pp. 1808-1818.

* cited by examiner

*Primary Examiner* — Chi H Pham
*Assistant Examiner* — Fan Ng
(74) *Attorney, Agent, or Firm* — Wall & Tong, LLP

(57) ABSTRACT

The invention includes a method and apparatus for determining a coincidence count associated with a traffic flow in a network. The method includes receiving a first packet having a first flow identifier associated with one of the traffic flows, comparing the first flow identifier of the first packet to each of a plurality of other flow identifiers associated with a respective plurality of other packets, and determining a coincidence count associated with the first flow identifier based on the comparison of the first flow identifier to each of the plurality of other flow identifiers. The method for determining a coincidence count associated with one of a plurality of traffic flows may be extended for determining respective coincidence counts associated with a plurality of traffic flows. The determined coincidence counts may be used for determining at least one traffic flow statistic.

20 Claims, 7 Drawing Sheets

100

300

600

METHOD AND APPARATUS FOR COINCIDENCE COUNTING FOR ESTIMATING FLOW STATISTICS

FIELD OF THE INVENTION

The invention relates to the field of communication networks and, more specifically, to flow estimation in packet networks.

BACKGROUND OF THE INVENTION

Typically, due to the connectionless nature of Internet Protocol (IP) networks, IP-routers do not maintain per-flow states. The gathering of flow-level statistics, however, is required for performing various network management functions such as network traffic planning and management, monitoring for service level compliance, detecting potential denial-of-service attacks, and the like. It is generally difficult to determine such statistics, which include the number of packets sent between pairs of hosts over a certain link during a certain time period, traffic pattern changes over time, and the like. In other words, accurate flow rate estimation is necessary for network planning, traffic management, service level assurance, network security, and like management functions.

In a "naïve counting" approach, flow counters must be maintained for all flows in the network, and each flow counter must be accessed for each arrival. Such "naïve counting" requires significant memory usage, rendering naïve counting prohibitively expensive. In a "heavy-hitters" approach, sampling is performed for selecting heavy-hitter flows having flow rates above a threshold, and all packets belonging to a heavy-hitter flow are counted. However, deriving the number of samples required to achieve a specified estimation accuracy is prohibitively difficult. In a "smart-sampling" approach, random packets from the arriving packets are sampled, and packets are assigned weights based on packet length for estimating flow bit-rates. However, the sampling accuracy is bounded by available memory, and the sampling result may be inaccurate.

SUMMARY OF THE INVENTION

Various deficiencies in the prior art are addressed through the invention of a method and apparatus for determining a coincidence count associated with a traffic flow in a network. The method includes receiving a first packet having a first flow identifier associated with one of the traffic flows, comparing the first flow identifier of the first packet to each of a plurality of other flow identifiers associated with a respective plurality of other packets, and determining a coincidence count associated with the first flow identifier based on the comparison of the first flow identifier to each of the plurality of other flow identifiers. The method for determining a coincidence count associated with one of a plurality of traffic flows may be extended for determining respective coincidence counts associated with a plurality of traffic flows. The determined coincidence counts may be used for determining at least one traffic flow statistic.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

In general, the present invention performs flow rate estimation of a proportion of total traffic flow belonging to different traffic flows transported within a network. In one embodiment, the present invention maintains registers for k previously received packets (denoted as previous arrivals), compares each currently received packet (denoted as a new arrival) with each of the k previous arrivals, and updates a coincidence count table according to the comparison of the new arrival with each of the k previous arrivals. In one embodiment, a coincidence count associated with the flow to which the new arrival belongs is incremented by one for each match between the new arrival and each of the k previous arrivals. The coincidence count table may be used for flow rate estimation. The new arrival replaces the one of the k previous arrivals having the earliest arrival time.

The present invention approaches the "naïve counting" algorithm in terms of accuracy for both small flows and large flows, while requiring significantly less memory than the "naïve counting" algorithm. For a given number of previous arrivals k, the present invention is generally: (1) on the order of k times more accurate than some other flow rate estimation algorithms for small flows having a flow rate less than ($1/(2k-1)$); and (2) approaches the "naïve counting" algorithm in terms of accuracy for larger flows. Furthermore, by treating all flows equally, the present invention prevents uncertainty that may arise from flow rate estimation algorithms using hashing in which small flows share hashing buckets with large flows.

The present invention provides a comprehensive solution for flow rate estimation under various conditions. The present invention enables rapid (i.e., short flow rate estimation times), accurate, memory-efficient flow rate estimation using efficient, real-time processing of traffic streams. The present invention obviates maintaining states for a large fraction of flows (e.g., where backbone links may include millions of flows) in order to gather flow rate statistics on a small fraction of the flows. Furthermore, the present invention, by using multiple comparisons, may be amenable to parallel or pipelined hardware implementations, thereby expanding design and implementation options.

Figure 1:
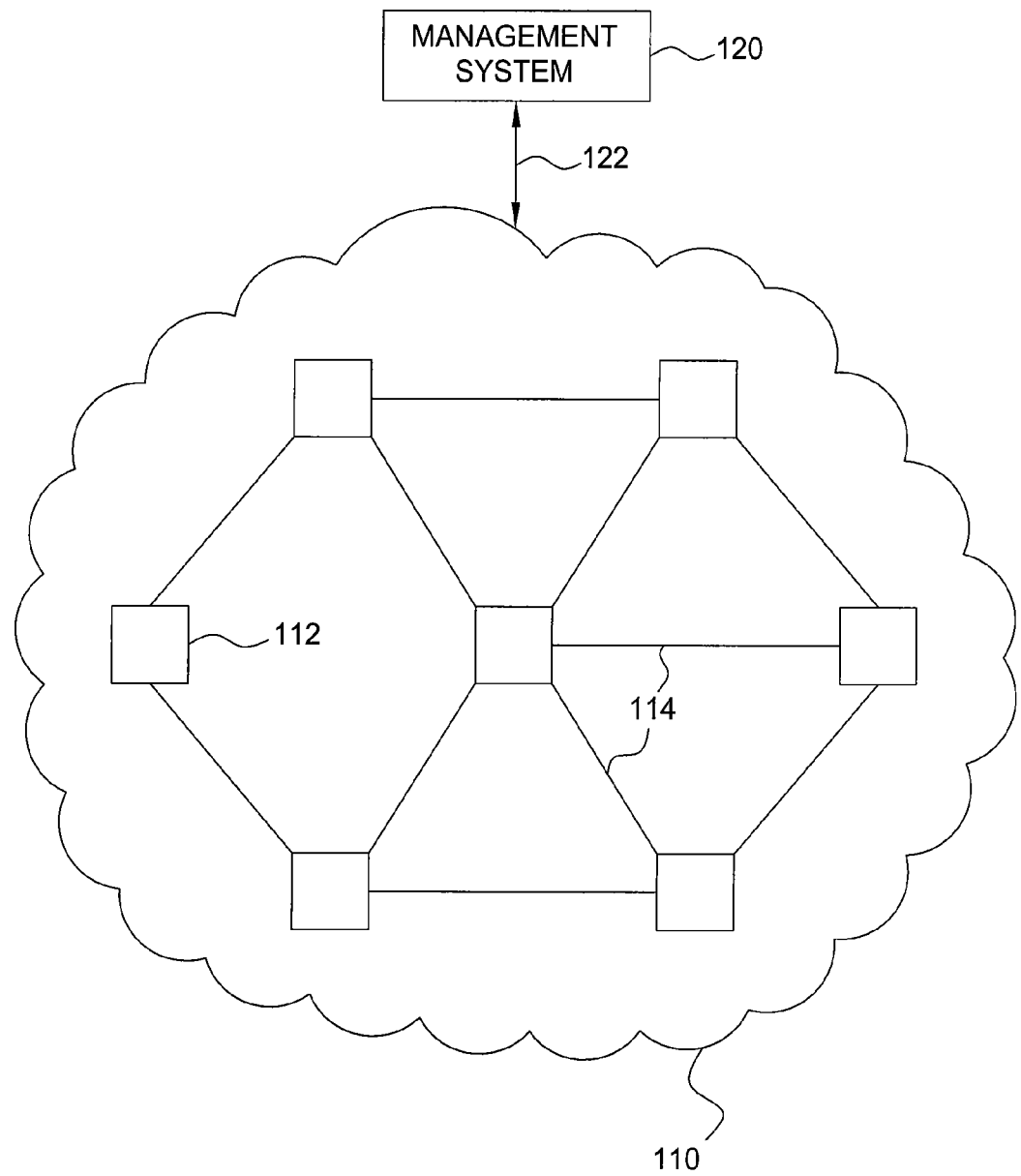
FIG. 1 depicts a high-level block diagram of a packet communication network.

FIG. 1 depicts a high-level block diagram of a communication network. Specifically, communication network 100 of FIG. 1 includes a network 110 and a management system 120. As depicted in FIG. 1, network 110 includes a plurality of nodes 112 (collectively, nodes 112) in communication using a plurality of links 114 (collectively, links 114). In one embodiment, nodes 112 operate as routers. In one such embodiment, network 110 is an IP network. Although depicted as comprising a specific network type and associated configuration, the present invention may be used in various other network types, as well as various other network configurations having fewer or more nodes, fewer or more links, different node and link configurations, and the like, as well as various combinations thereof.

The nodes 112 include network elements adapted for conveying packets from source node to destination node. In one embodiment, nodes 112 include packet forwarding capabilities. In one embodiment, nodes 112 include packet routing capabilities. As depicted in FIG. 1, nodes 112 may operate as source nodes, intermediate nodes, and destination nodes for a plurality of traffic flows (e.g., on the order of thousands or on the order of millions, depending upon the flow definition). In one embodiment, nodes 112 may be adapted for processing arriving packets (where each arriving packet is associated with one of a plurality of defined traffic flows) for determining various flow statistics (e.g., flow volume estimates, flow rate estimates, and the like, as well as various combinations thereof).

In general, a flow in a packet network may be defined using any information included in the packets transported over the packet network. In one embodiment, a flow definition may be formed using packet header information. In one such embodiment, a flow definition may be formed such that the flow corresponding to the flow definition includes packets having identical values for a specified packet header field(s). For example, in one embodiment, a flow includes packets having identical values for the following packet header fields: SourceIP, SourcePort, DestinationIP, DestinationPort, ProtocolID (denoted as a five-tuple flow definition). Although described herein with respect to a specific five-tuple flow definition, the present invention may be used for determining flow statistics using an x-tuple flow definition (e.g., using less or more information, other combinations of packet header fields, and the like, as well as various combinations thereof).

As depicted in FIG. 1, management system 120 communicates with network 110 (using a management communication link 122) for performing various management functions, such as network planning, traffic planning, traffic management, service level assurance, network security, and like management functions, as well as various combinations thereof. In one embodiment, management system 120 performs at least a portion of such management functions using traffic flow statistics. In one embodiment, management system 120 obtains at least a portion of the traffic flow statistics from network 110. In one such embodiment, management system 120 obtains traffic flow statistics determined (e.g., measured, estimated, predicted, and the like) by nodes 112.

Figure 2:
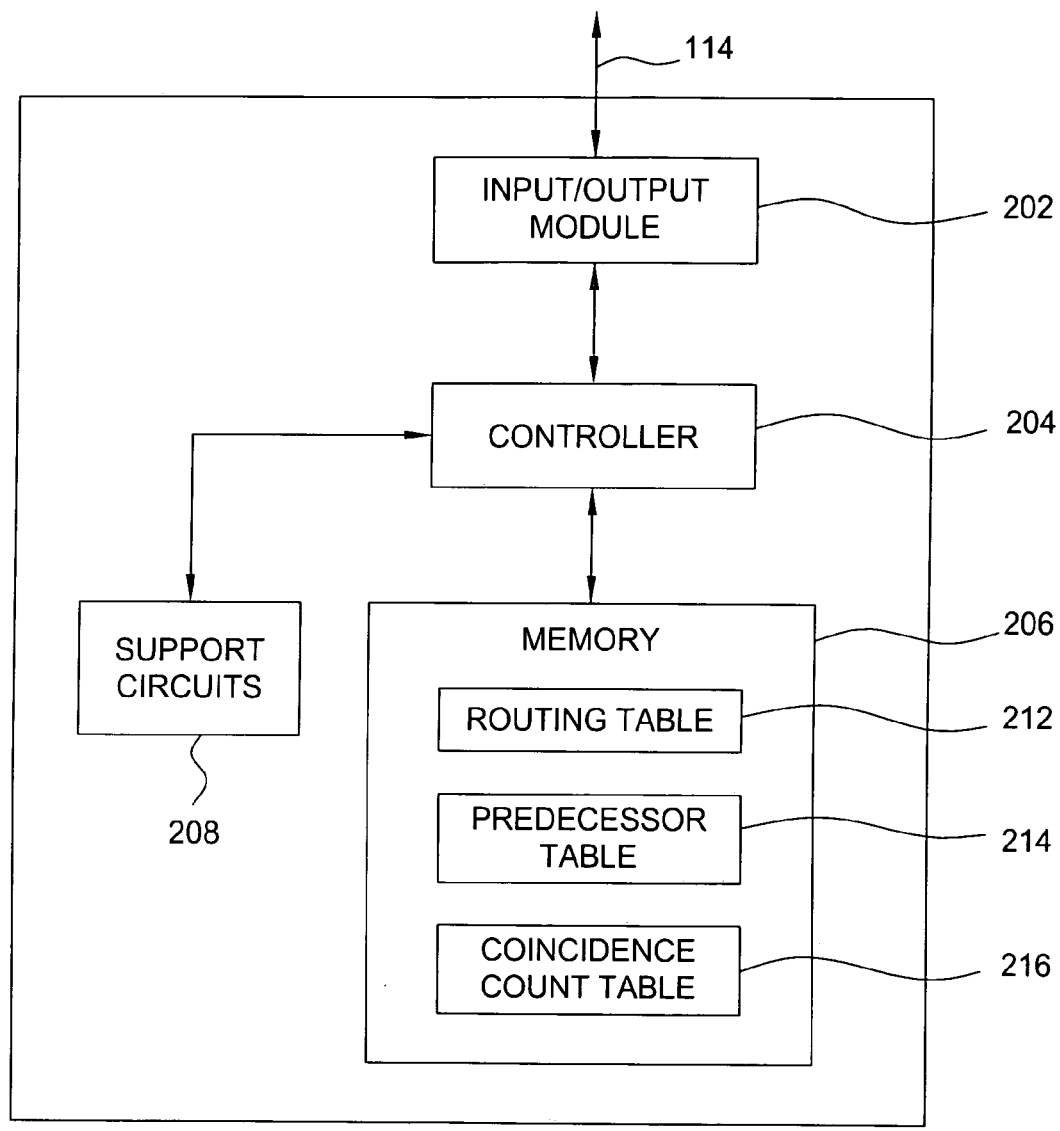
FIG. 2 depicts a high-level block diagram of a node of the packet communication network of FIG. 1.

FIG. 2 depicts a high-level block diagram of a node of the communication network of FIG. 1. Specifically, node 112 of FIG. 2 comprises an input-output (I/O) module 202, a controller 204, a memory 206, and support circuits 208. As depicted in FIG. 2, controller 204 is coupled to I/O module 202, memory 206, and support circuits 208. As depicted in FIG. 2, I/O module 202 enables communication with other nodes 112 in network 110 using at least one link 114 (depicted as a single link for purposes of clarity). As depicted in FIG. 2, memory 206 comprises a routing table 212 for routing packets within network 110, a predecessor table for maintaining a plurality of previous arrivals (e.g., k most recent packets received by node 112), and a coincidence count table for maintaining total coincidence counts for flows identified by node 112.

The controller 204 performs at least a portion of the functions described herein (e.g., predecessor table access functions, flow identifier comparison functions, incremental coincidence count determination functions, coincidence count table access functions, coincidence count table update functions, predecessor table update functions, and the like, as well as various combinations thereof). As depicted and described herein, controller 204 communicates with various combinations of I/O module 202, memory 206, and support circuits 208 for providing at least a portion of the functions described herein. Although described herein as being implemented in hardware, software, or a hardware/software combination, at least a portion of the functions described herein may be implemented using any hardware, firmware, or software, as well as various combinations thereof.

Figure 3:
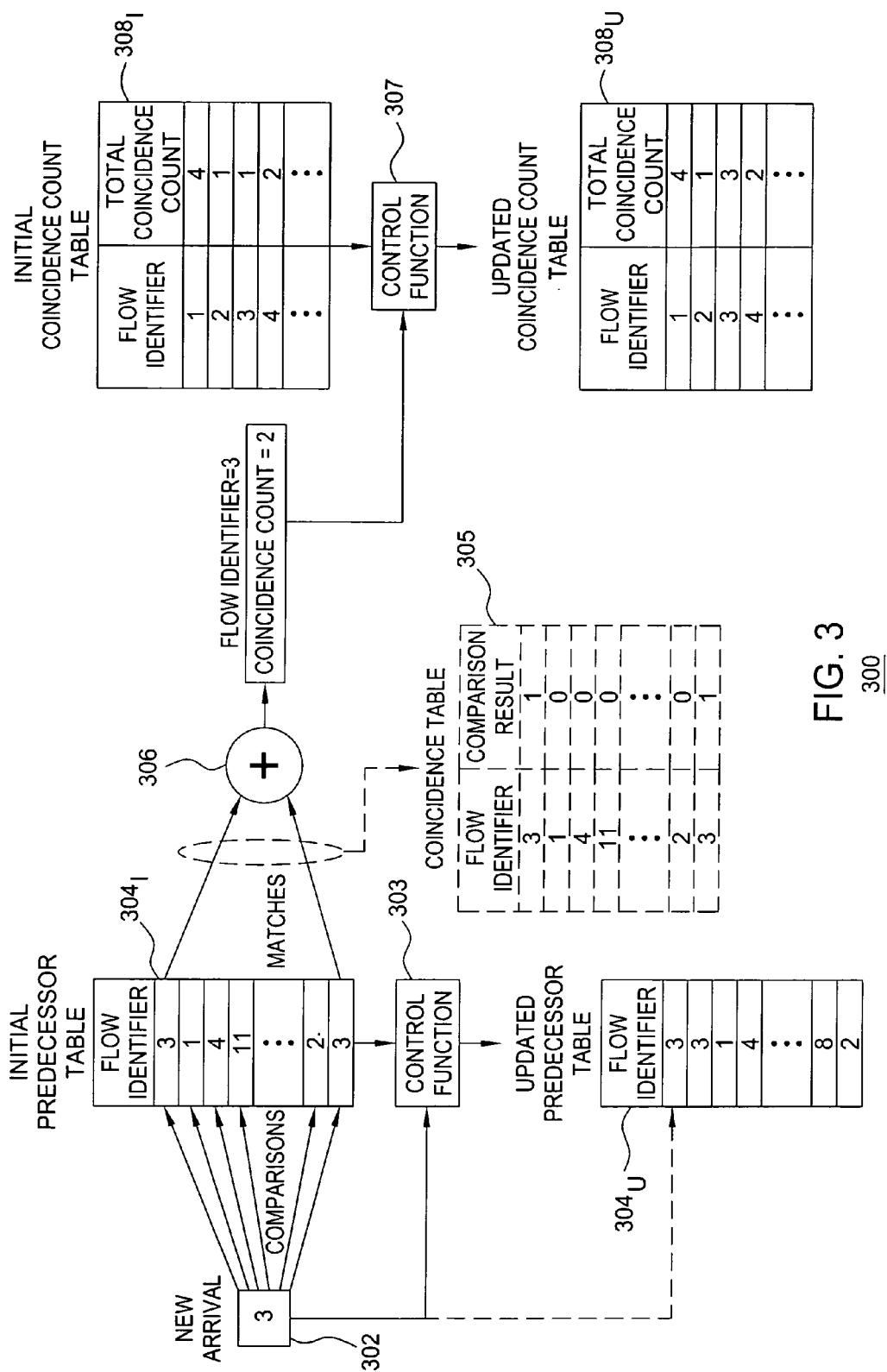
FIG. 3 depicts a high-level block diagram of a logical representation of a method according to one embodiment of the present invention.

FIG. 3 depicts a high-level block diagram of a logical representation of a method according to one embodiment of the present invention. As depicted in FIG. 3, logical representation 300 is described within the context of node 112 depicted and described herein with respect to FIG. 2. As depicted in FIG. 3, logical representation 300 is described with respect to a new arrival 302, a control function 303, a predecessor table 304, an adding function 306, a control function 307, and a coincidence count table 308. As depicted in FIG. 3, predecessor table 304 and coincidence count table 308 correspond to predecessor table 214 and coincidence count table 216 depicted and described with respect to FIG. 2, respectively.

Although not depicted, in one embodiment, controller 204 (in combination with memory 206 and support circuits 208) depicted and described with respect to FIG. 2, may perform at least a portion of the functions depicted and described with respect to FIG. 3 as being performed by control function 303, adding function 306, and control function 307. As such, although not depicted, in one embodiment, controller 204, performs flow identifier comparisons, flow identifier match processing, predecessor table updates, coincidence count summations, coincidence count table updates, and performs other functions depicted and described with respect to FIG. 3. The functions of the present invention described within the context of logical representation 300 of FIG. 3 are further described herein with respect to FIG. 4-FIG. 6.

As depicted in FIG. 3, a new arrival 302 (i.e., a packet) is received at node 112. A controller (e.g., controller 204) determines the flow identifier of new arrival 302. As depicted in FIG. 3, the flow identifier of new arrival 302 is three. In one embodiment, in which the flow definition includes a plurality of packet header field values (e.g., a five-tuple including SourceIP, SourcePort, DestinationIP, DestinationPort, ProtocolID), rather than using the full flow identifier (including the set of packet header field values) as the flow identifier, the full flow identifier associated with the identified flow may be mapped to a simpler flow identifier (e.g., an integer, such as the flow identifier associated with new arrival 302). In one such embodiment, reduced flow identifiers may be stored in predecessor table 304, coincidence count table 308, and other permanent and temporary tables formed for performing various functions of the present invention.

As depicted in FIG. 3, flow identifiers associated with packets stored in initial predecessor table $304_I$ include three, one, four, eleven, . . . , two, three. As depicted in FIG. 3, new arrival 302 is compared to each of a plurality of previous arrivals stored in initial predecessor table $304_I$. In one embodiment, new arrival 302 is compared to each of a plurality of stored previous arrivals using flow identifiers associated with each of the arrivals. In one such embodiment, the flow identifier of new arrival 302 is contemporaneously compared to each of the flow identifiers of the previous arrivals stored in initial predecessor table $304_I$. In another such embodiment, the flow identifier of new arrival 302 is serially compared to each of the flow identifiers of the previous arrivals stored in predecessor table $304_I$.

In one embodiment, each comparison of the flow identifier of new arrival 302 to each of the flow identifiers of the previous arrivals stored in initial predecessor table $304_I$, results in one of: (1) a match condition (i.e., the flow identifiers match) or (2) a no-match condition (i.e., the flow identifiers do not match). In one embodiment, each match condition is assigned a value of one and each no-match condition is assigned a value of zero. In other embodiments, various other values may be assigned to match conditions and no-match conditions, however, processing of such values for determining a coincidence count associated with the flow identifier of the new arrival may require additional processing (i.e., using different processing functions, in place of or in addition to, adding function 306).

As depicted in FIG. 3, the flow identifier of new arrival 302 matches the flow identifier of the first entry in initial predecessor table $304_I$ and the flow identifier of the last entry in initial predecessor table $30_{4I}$. The flow identifier of new arrival 302 does not match any of the flow identifiers of any of the other entries in initial predecessor table $304_I$. In one embodiment, in which match conditions are assigned a value of one and no-match conditions are assigned a value of zero, a coincidence count associated with the flow identifier of new arrival 302 is determined by summing the match condition values. As depicted in FIG. 3, the match condition values are summed by adding function 306, resulting in a coincidence count (i.e., coincidence count=2) associated with the flow identifier of new arrival 302.

As depicted in FIG. 3, in one embodiment, results from the comparison of the flow identifier of new arrival 302 to each of the flow identifiers of the previous arrivals stored in initial predecessor table $304_I$, may be maintained in an optional comparison results table 305. In one such embodiment, optional comparison results table 305 may include a comparison result (e.g., one for match; zero for no-match) for each flow identifier in initial predecessor table $304_I$. In one embodiment, optional comparison results table 305 may be reset for each new arrival (i.e., optional comparison results table 305 is a temporary table). As depicted in FIG. 3, optional comparison results table 305 includes a comparison result of zero for each entry with the exception of the first entry and last entry (i.e., entries for which flow identifier is three).

As depicted in FIG. 3, following the comparison of the flow identifier of new arrival 302 to each of the flow identifiers of the previous arrivals stored in initial predecessor table $304_I$, control function 303 updates initial predecessor table $304_I$, to include new arrival 302, thereby forming updated predecessor table $304_U$. In one embodiment, the previous arrival (or the flow identifier of the previous arrival in an embodiment in which the entire packet is not stored) with the earliest arrival time is removed from initial predecessor table $304_I$, and new arrival 302 (or the flow identifier of new arrival 302) is added in place of the removed previous arrival to form updated predecessor table $304_U$. As depicted in FIG. 3, flow identifiers associated with packets stored in updated predecessor table $304_U$ include three, three, one, four, . . . , eight, two.

As depicted in FIG. 3, the coincidence count associated with the flow identifier of new arrival 302 is stored in coincidence count table 308. As depicted in FIG. 3, coincidence count table 308 includes a plurality of entries, where each entry includes a flow identifier and an associated coincidence count. As depicted in FIG. 3, initial coincidence count table 308 includes: a total coincidence count of four for flow identifier one, a total coincidence count of one for flow identifier two, a total coincidence count of one for flow identifier three, a total coincidence count of two for flow identifier four, as well as a plurality of other total coincidence counts associated with a respective plurality of other flow identifiers (not depicted for purposes of clarity).

As depicted in FIG. 3, control function 307 updates initial coincidence count table $308_I$, (comprising the state of the flow rate estimation before processing of new arrival 302) using the coincidence count determined by adding function 306, thereby producing updated coincidence count table $308_U$ (comprising the state of the coincidence count after processing of new arrival 302). As depicted in FIG. 3, the total coincidence count value associated with the flow identifier of new arrival 302 in initial coincidence count table $308_I$, is incremented by the coincidence count determined by adding function 306 (i.e, coincident count=2) to form the total coincidence count value associated with the flow identifier of new arrival 302 in updated coincidence count table $308_U$. In one embodiment, coincidence count table 308 may be used for determining at least one flow statistic.

Figure 4:
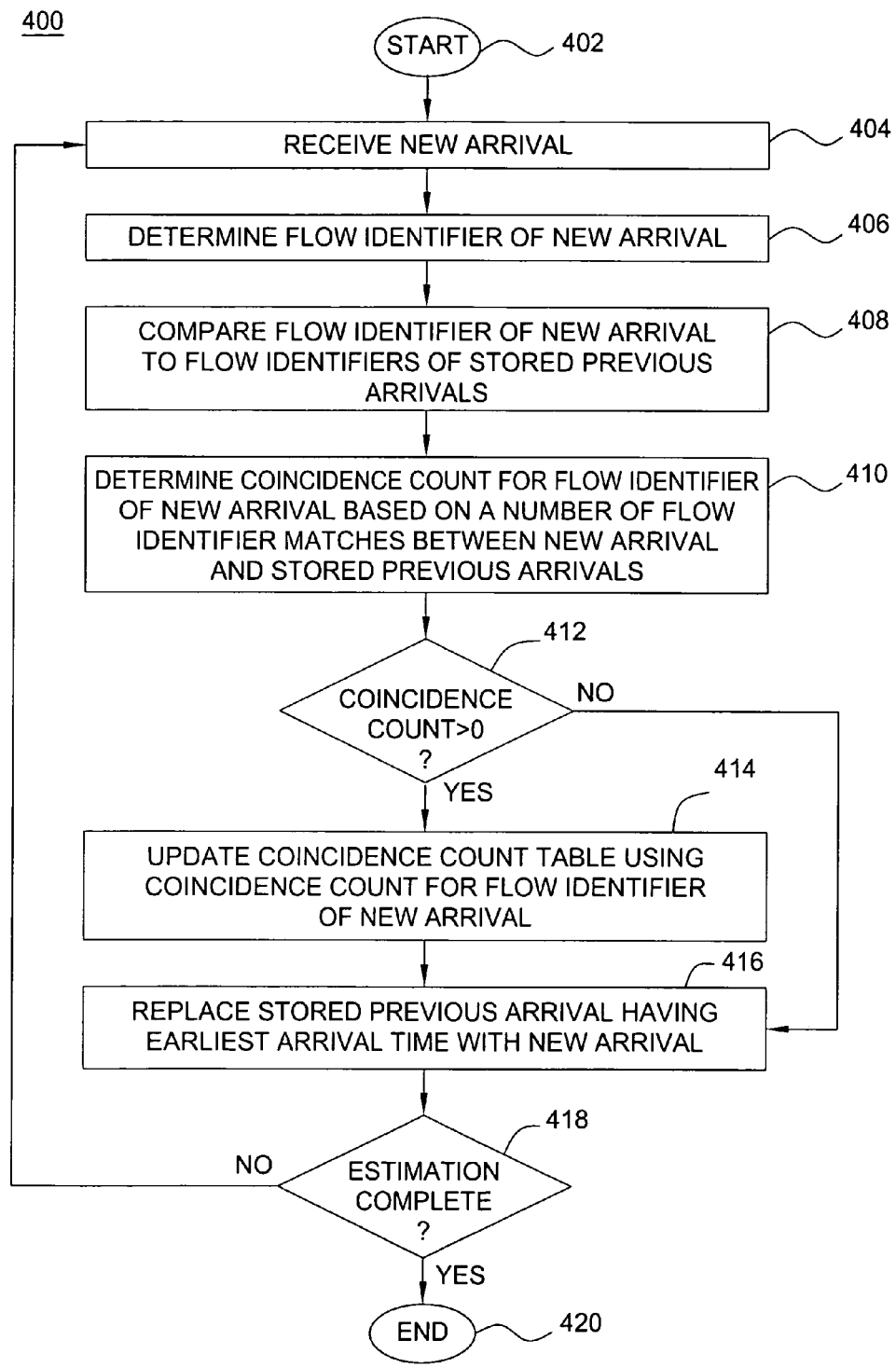
FIG. 4 depicts a method according to one embodiment of the present invention.

FIG. 4 depicts a method according to one embodiment of the present invention. Specifically, method 400 of FIG. 4 includes a method of determining a coincidence count for a flow identifier associated with a new arrival, wherein the coincidence count is adapted for use in determining at least one flow statistic. Although described herein with respect to one of the nodes 112, method 400 may be performed at each of the nodes 112. Although depicted as being performed serially, those skilled in the art will appreciate that at least a portion of the steps of method 400 may be performed contemporaneously, or in a different order than presented in FIG. 4. The method 400 begins at step 402 and proceeds to step 404.

At step 404, a new arrival is received. At step 406, the flow identifier of the new arrival is determined. At step 408, the flow identifier of the new arrival is compared to the flow identifiers of stored previous arrivals. At step 410, a coincidence count is determined for the flow identifier of the new arrival. In one embodiment, the coincidence count for the flow identifier of the new arrival is determined based on the comparison of the flow identifier of the new arrival to the flow identifiers of the stored previous arrivals. In one embodiment, the coincidence count for the flow identifier of the new arrival is determined based on a number of flow identifier matches between the new arrival and the stored previous arrivals. At step 412, a determination is made as to whether the coincidence count is greater than zero. If the coincidence count is not greater than zero, method 400 proceeds to step 416. If the coincidence count is greater than zero, method 400 proceeds to step 414. At step 414, the coincidence count table is updated using the coincidence count for the flow identifier of the new arrival. At step 416, the stored previous value with the earlier arrival time is replaced by the new arrival for processing subsequent arrivals. At step 418, a determination is made as to whether the estimation is complete (e.g., whether N total arrivals have been processed). If the estimation is not complete, method 400 returns to step 404, at which point a new arrival is received for processing. If the estimation is complete, method 400 proceeds to step 420 where method 400 ends.

Figure 5:
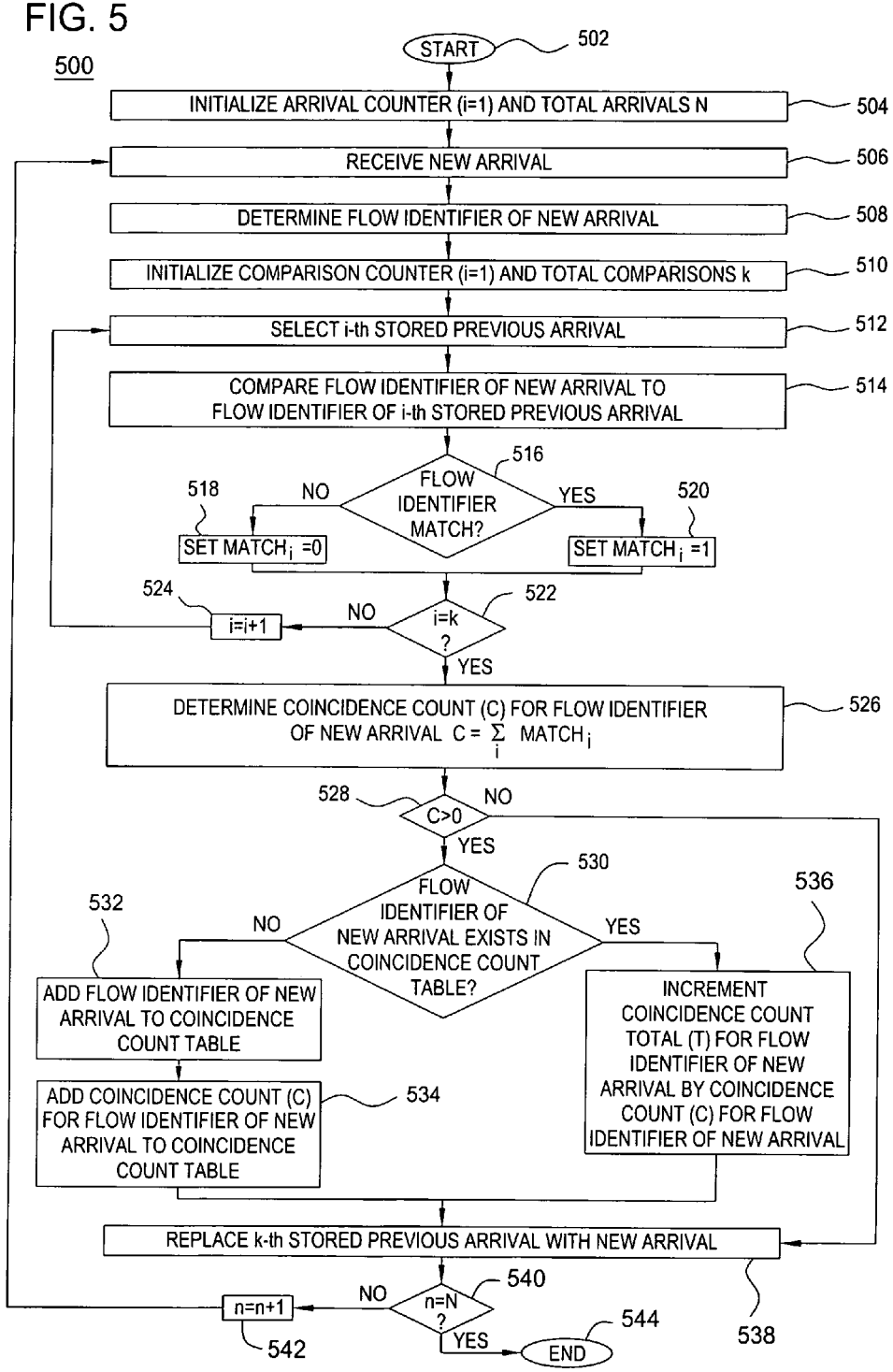
FIG. 5 depicts a method according to one embodiment of the present invention.

FIG. 5 depicts a method according to one embodiment of the present invention. Specifically, method 500 of FIG. 5 comprises a method for determining a coincidence count for a flow identifier associated with a new arrival, wherein the coincidence count is adapted for use in determining at least one flow statistic. Although described herein with respect to one of the nodes 112, method 500 may be performed at each of the nodes 112. Although depicted as being performed serially, those skilled in the art will appreciate that at least a portion of the steps of method 500 may be performed contemporaneously, or in a different order than presented in FIG. 5. The method 500 begins at step 502 and proceeds to step 504.

At step 504, an arrival counter (denoted as n) is initialized (n=1) and a total number of arrivals (denoted as N) is initialized (i.e., initialized to the number of arrivals to be processed in the current estimation window). At step 506, a new arrival is received. At step 508, the flow identifier of the new arrival is determined. At step 510, a comparison counter (denoted as i) is initialized (i=1) and a total number of comparisons (denoted as k) is initialized (i.e., initialized to the number of previous arrivals stored for comparison with each new arrival). At step 512, an $i^{th}$ stored previous arrival is selected (e.g., from predecessor table 214).

At step 514, the flow identifier of the new arrival is compared to the flow identifier of the $i^{th}$ stored previous arrival. At step 516, a determination is made as to whether the flow identifier of the new arrival matches the flow identifier of the $i^{th}$ stored previous arrival. If the flow identifier of the new arrival does not match the flow identifier of the $i^{th}$ stored previous arrival, method 500 proceeds to step 518, at which point the match value is set equal to zero ($MATCH_i=0$). If the flow identifier of the new arrival matches the flow identifier of the $i^{th}$ stored previous arrival, method 500 proceeds to step 520, at which point a match value is set equal to one ($MATCH_i=1$). From steps 518 and 520, method 500 proceeds to step 522.

At step 522, a determination is made as to whether comparison counter i is equal to k. If comparison counter i is not equal to k (i≠k), method 500 proceeds to step 524, at which point comparison counter i is incremented by one (i=i+1). From step 524, method 500 returns to step 512. If comparison counter i is equal to k (i=k), method 500 proceeds to step 526. At step 526, a coincidence count (denoted as C) is determined for the flow identifier of the new arrival. In one embodiment, coincidence count C is determined using the set of match values ($MATCH_i$ for i=1 . . . k). In one embodiment, coincidence count C is computed as a summation of match values (i.e., $C=\Sigma_i MATCH_i$).

At step 528, a determination is made as to whether there is at least one match between the flow identifier of the new arrival and the flow identifiers of the k stored previous arrivals (i.e., whether C>0). If there are no matches between the flow identifier of the new arrival and the flow identifiers of the k stored previous arrivals (i.e., C=0), method 500 proceeds to step 538. If there is at least one match between the flow identifier of the new arrival and the flow identifier of the k stored previous arrivals (i.e., C>0), method 500 proceeds to step 530. At step 530, a determination is made as to whether the flow identifier of the new arrival exists in the coincidence count table (illustratively, coincidence count table 216). If the flow identifier of the new arrival exists in the coincidence count table, method 500 proceeds to step 536. If the flow identifier of the new arrival does not exist in the coincidence count table, method 500 proceeds to step 532.

At step 532, the flow identifier of the new arrival is added to the coincidence count table (illustratively, as a new entry in coincidence count table 216 of FIG. 2). At step 534, the coincidence count C determined for the flow identifier of the new arrival is added to the coincidence count table as the coincidence count total (denoted as T) associated with the flow identifier of the new arrival. At step 536, the coincidence count total for the flow identifier of the new arrival is incremented by coincidence count C determined for the flow identifier of the new arrival (i.e., T=T+C for the flow identifier of the new arrival). From steps 534 and 536, method 500 proceeds to step 538.

At step 538, the $k^{th}$ stored previous arrival (e.g., the stored previous arrival with the earliest arrival time) is replaced with the new arrival (i.e., stored previous arrivals i through k−1 become stored previous arrivals i+1 through k and new arrival becomes stored previous arrival i). At step 540, a determination is made as to whether the estimation window is complete (i.e., whether arrival counter n is equal to total arrivals N). If the estimation window is not complete, method 500 proceeds to step 542, at which point arrival counter n is incremented by one (n=n+1). From step 542, method 500 returns to step 506, at which point a new arrival is received. If the estimation window is complete, method 500 proceeds to step 544, where method 500 ends.

Figure 6:
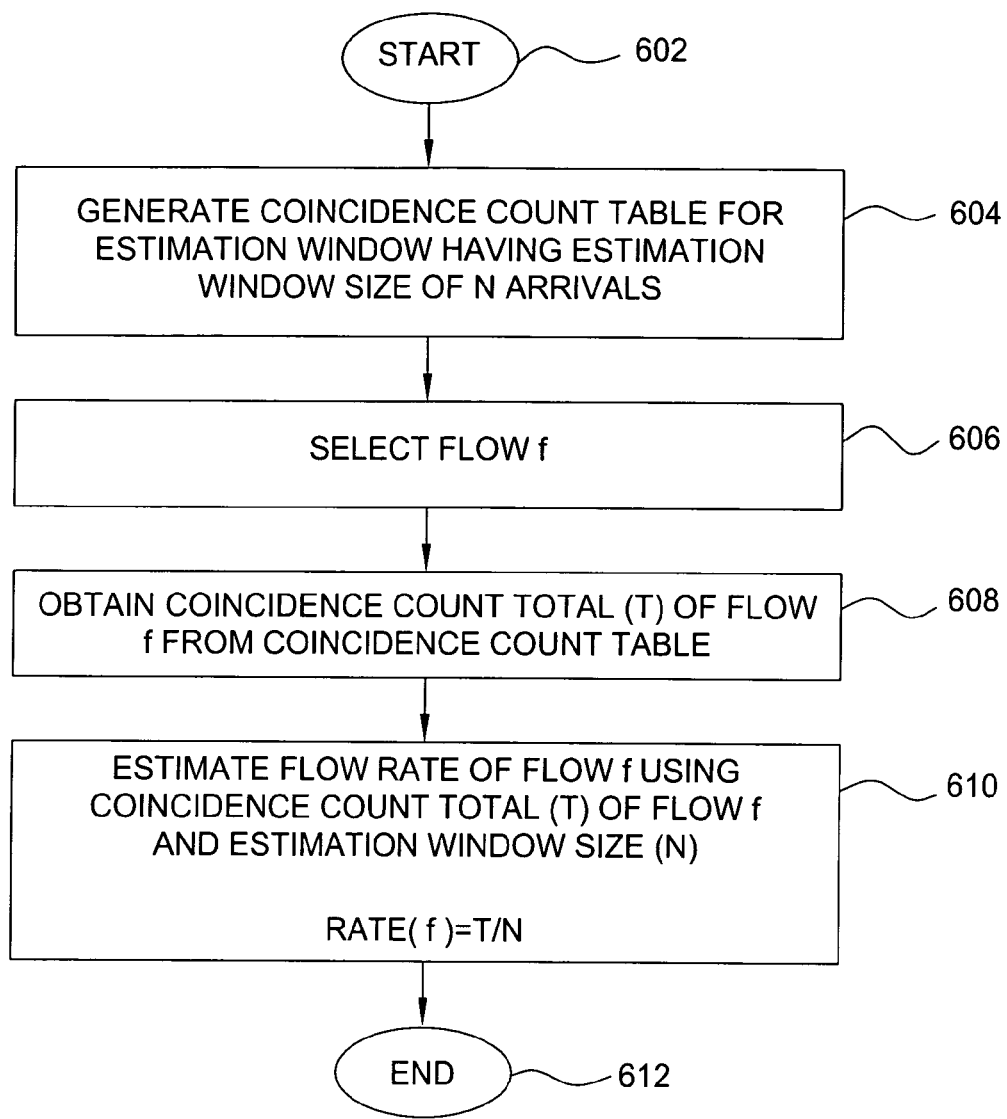
FIG. 6 depicts a method according to one embodiment of the present invention.

FIG. 6 depicts a method according to one embodiment of the present invention. Specifically, method 600 of FIG. 6 includes a method for estimating a flow rate. Although described herein with respect to one of the nodes 112, in one embodiment, method 600 may be performed by each of the nodes 112. Although described herein with respect to one of the nodes 112, in one embodiment, at least a portion of method 600 may be performed by management system 120. Although depicted as being performed serially, those skilled in the art will appreciate that at least a portion of the steps of method 600 may be performed contemporaneously, or in a different order than presented in FIG. 6. The method 600 begins at step 602 and proceeds to step 604.

At step 604, a coincidence count table is generated for an estimation window having an estimation window size of N arrivals (i.e., N arrivals were processed for generating the coincidence count table). In one embodiment, the coincidence count table is generated using at least one of method 400 or method 500 depicted and described herein with respect to FIG. 4 and FIG. 5, respectively. At step 606, a flow f is selected. At step 608, the coincidence count total (T) for selected flow f is obtained from the coincidence count table. At step 610, the flow rate of flow f is estimated using the coincidence count total (T) and estimation window size (N): RATE(f)=T/N. At step 612, method 600 ends. Although depicted and described herein with respect to determining a specific flow statistic, various other flow statistics may be determined using at least one coincidence count table.

Figure 7:
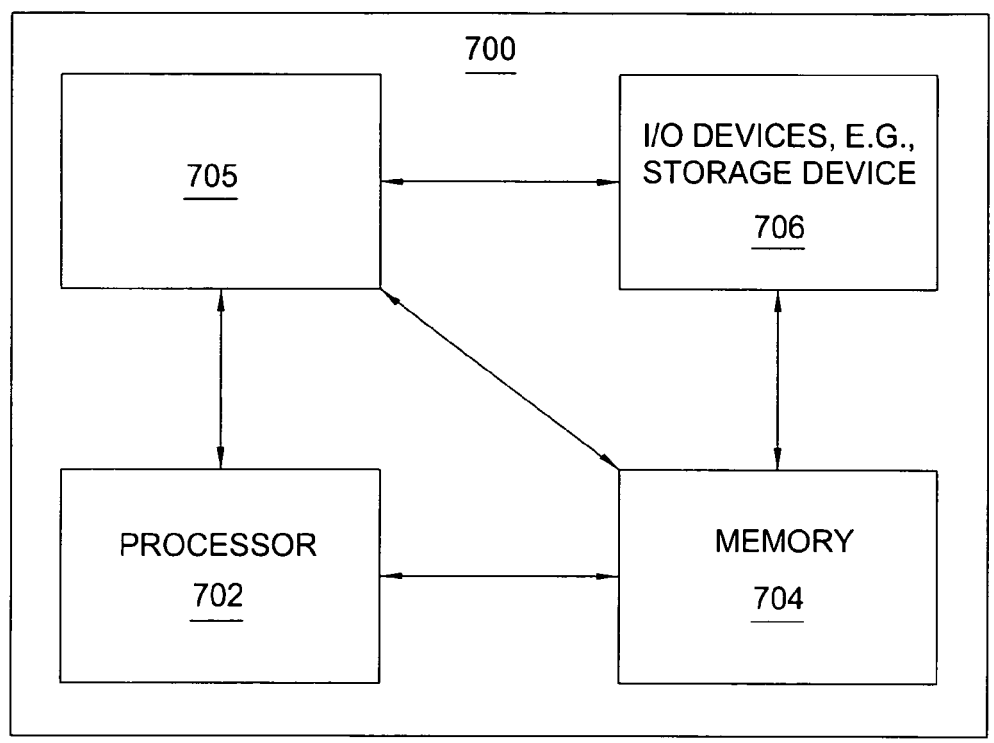
FIG. 7 depicts a high-level block diagram of a general-purpose computer suitable for use in performing the functions described herein.

FIG. 7 depicts a high-level block diagram of a general purpose computer suitable for use in performing the functions described herein. As depicted in FIG. 7, system 700 comprises a processor element 702 (e.g., a CPU), a memory 704, e.g., random access memory (RAM) and/or read only memory (ROM), a coincidence tracking control module 705, and various input/output devices 706 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present coincidence tracking control module or process 705 can be loaded into memory 704 and executed by processor 702 to implement the functions as discussed above. As such, coincidence tracking control process 705 (including associated data structures) of the present invention can be stored on a computer readable medium or carrier, e.g., RAM memory, magnetic or optical drive or diskette and the like.

The various embodiments of the present invention described herein may be adapted, under various different monitoring, processing, and like conditions, for using other assumptions, formulations, methodologies, and the like, as well as various combinations thereof. In one embodiment, an assumption is made that each new arrival belongs to one of F flows. In one such embodiment, the arrival rate of flow f∈F to a node may be denoted as $r_f$ and the total arrival rate to the node may be denoted as $\lambda = \Sigma_{f \in F} r_f$. In this embodiment, the proportion of arriving traffic belong to flow f∈F may then be computed as $p_f = r_f / \lambda$. In one embodiment, the present invention enables efficient estimation of $r_f$ for each f∈F. In one such embodiment, since measuring $\lambda$ is simpler than estimating $r_f$, an estimate of the proportion of arriving traffic belonging to flow f (denoted as $p'_f$) may be determined. In one embodiment, for purposes of clarity, an assumption may be made that $p_f$ remains constant over the time during which flow rate estimation is performed. In one embodiment, an assumption is made that the probability that an arriving packet belongs to a given flow is independent of all other packets, however, if the packet arrivals to a node are controlled by some closed loop control mechanism (e.g., Transmission Control Protocol (TCP)) close packet arrivals may have some interdependencies. In one embodiment, in order to reduce such packet interdependencies, random sampling may be performed.

In one embodiment, accuracy of the present invention in performing flow rate estimation may be measured with respect to sample size and memory size. The sample size is defined to be the number of arrivals required to perform the estimation. Although primarily described herein with respect to estimation time, it should be noted that terms such as estimation time, sampling time, and like terms may be used interchangeably with sample size. In one embodiment, the number of flows that are tracked for performing identifying coincidences and performing associated flow rate estimations may be used as a measure of memory size.

In one embodiment, an assumption is made that the proportion for most flows is less than a threshold proportion $\Delta$, while the proportion for some flows is greater than threshold proportion $\Delta$. In one such embodiment, an objective is ensuring that a flow rate estimation is accurate in the range $[0, \Delta]$. In this embodiment, given a threshold proportion $0 \leq \Delta \leq 1$ and a parameter $\theta \geq 1$, a sampling scheme for use with the present invention may be implemented such that an error $\beta$ is tolerable with probability less than $\alpha$ for all $p_f \leq \Delta$ and an error of $\theta\beta$ is tolerable with probability less than a for all $p_f \geq \Delta$. In other words, a sampling scheme for use with the present invention may be implemented such that, with probability greater than $\alpha$:

$$p'_f \in \left(p_f - \frac{\beta}{2}, p_f + \frac{\beta}{2}\right) \quad \text{if } p_f \leq \Delta \qquad \text{Eq. 1}$$

$$p'_f \in \left(p_f - \frac{\theta\beta}{2}, p_f + \frac{\theta\beta}{2}\right) \quad \text{if } p_f \geq \Delta \qquad \text{Eq. 2}$$

Since the flow identifier comparisons of the present invention are not independent, covariances between the flow identifier comparisons must be accounted for in order to accurately compute the variance of the estimators of the proportions. In one embodiment, an assumption may be made that arrivals are an independent, identically distributed (IID) process in which the probability that an arrival belongs to a flow f is given by $p_f$. By labeling arrivals 1 to N based on the arrival sequence and letting $C_{ij}(f)=1$ if arrivals i and j belong to flow f and letting $C_{ij}(f)=0$ otherwise, the number of coincidences for flow f after N arrivals (denoted as M(N,f)) may be computed as:

$$M(N, f) = \sum_{i \leq N} \sum_{j=i-k}^{i-1} C_{ij}(f) \qquad \text{Eq. 3}$$

Since the probability that an arrival belongs to flow f is given by $p_f$, and letting $C_{ij}(f)=1$ if arrivals i and j belong to flow f and letting $C_{ij}(f)=0$ otherwise, the expectation of $C_{ij}(f)$ (denoted as $E[C_{ij}(f)]$) and variance of $C_{ij}(f)$ (denoted as VAR $[C_{ij}(f)]$) may be computed using the probability $p_f$ that an arrival belongs to flow f. Given $C_{ij}(f)$ and $C_{im}(f)$ for i-k≤j, m≤i-1, the covariance between $C_{ij}(f)$ and $C_{im}(f)$ (denoted as COV$[C_{ij}(f),C_{im}(f)]$) may be computed using probability $p_f$ that an arrival belongs to flow f. Furthermore, letting M(N,f) denote the number of coincidences for flow f after N arrivals, expectation of M(N,f) (denoted as E[M(N,f)]) and variance of M(N,f) (denoted as VAR[M(N,f)]) may be computed using the number of arrivals N, the number of stored previous values k, and the probability $p_f$ that an arrival belongs to flow f. The expectation, variance, and covariance equations described above are defined as follows:

$$E[C_{ij}(f)] = p_f^2 \qquad \text{Eq. 4}$$

$$\text{VAR}[C_{ij}(f)] = p_f^2(1 - p_f^2) \qquad \text{Eq. 5}$$

$$\text{COV}[C_{ij}(f), C_{im}(f)] = p_f^3(1 - p_f) \qquad \text{Eq. 6}$$

$$E[M(N, f)] = Nkp_f^2 \qquad \text{Eq. 7}$$

$$\text{VAR}[M(N, f)] = Nkp_f^2(1 - p_f^2)\left[1 + \frac{2(2k-1)p_f}{(1+p_f)}\right] \qquad \text{Eq. 8}$$

Since VAR[M(N,f)]=$Nkp_f^2(1-p_f^2)$ if all samples are independent of each other, the correlation among samples associated with the present invention increases the variance of M(N,f) by a factor of $[(2(2k-1)p_f)/(1+p_f)]$. Furthermore, since expectation and variance for the number of coincidences is known, the central limit theorem may be used to obtain a normal approximation for the number of coincidences. The normal approximation for the number of coincidences may be used for the estimator of the proportion. Although the comparisons are not independent, the comparisons are a stationary $k^2$-dependent sequence with finite expectation and variance such that the variance of the estimator (as well as the upper bound on the variance of the estimator) may be expressed as follows:

$$\sqrt{Nk}\left[\sqrt{\frac{M(N, f)}{Nk}} - p_f\right] \sim N[0, \sigma_f^2] \qquad \text{Eq. 9}$$

where $$\sigma_f^2 = \frac{(1 - p_f^2)\left(1 + \frac{2(2k-1)p_f}{(1+p_f)}\right)}{4}$$

-continued $$\sigma_f^2 \leq \frac{k^2}{4k-1} \Rightarrow \sigma_f^2 \leq 0.75 \text{ if } p_f < \frac{1}{2k-1} \forall k \quad \text{Eq. 10}$$

From the variance of the estimator (as expressed in Eq. 9), the upper bound on the variance of the estimator may be derived as (as expressed in Eq. 10). In one embodiment, the upper bound on the variance of the estimator may be used for computing sample size and estimation accuracy for various embodiments of the present invention. Furthermore, letting L(N) denote the number of flows that have at least one comparison match up to N arrivals, and given a specified accuracy requirement (e.g., letting $Z_\alpha$ denote the $\alpha$ percentile for the unit normal distribution and letting $\beta$ denote tolerable error), maximum expected memory size required for implementing the present invention may be computed as $E[L(N)] \leq 1.11 Z_\alpha / \beta$.

Although various embodiments which incorporate the teachings of the present invention have been shown and described in detail herein, those skilled in the art can readily devise many other varied embodiments that still incorporate these teachings.

What is claimed is:

1. A method for determining a coincidence count total associated with one of a plurality of traffic flows, wherein the coincidence count total is determined at a node, the method comprising:
   receiving, at the node, a first packet having a first flow identifier associated with one of the traffic flows;
   comparing the first flow identifier of the first packet to each of a plurality of other flow identifiers which are determined from a respective plurality of other packets received at the node;
   determining a coincidence count associated with the first flow identifier based on the comparison of the first flow identifier to each of the plurality of other flow identifiers, wherein the coincidence count is a number of matches of the first flow identifier to the other flow identifiers; and
   updating a coincidence count table for the first flow identifier using the coincidence count.

2. The method of claim 1, wherein each of the plurality of other packets is received at the node prior to the first packet.

3. The method of claim 2, wherein each of the plurality of other packets is stored at the node, the method further comprising:
   storing the first packet by replacing one of the plurality of other packets with the first packet, wherein the replaced one of the plurality of other packets is the one of the plurality of other packets having an earliest receipt time.

4. The method of claim 1, wherein comparing comprises:
   for each of the other flow identifiers:
      selecting the other flow identifier; and
      comparing the first flow identifier to the selected other flow identifier.

5. The method of claim 4, wherein, determining the coincidence count associated with the first flow identifier comprises:
   for each of the other flow identifiers selected for comparison with the first flow identifier:
      setting a match value for the other flow identifier based on the comparison of the first flow identifier to the other flow identifier, wherein:
         in response to a determination that the first flow identifier matches the other flow identifier, the associated match value is set to one; or
         in response to a determination that the first flow identifier does not match the other flow identifier, the associated match value is set to zero.

6. The method of claim 5, wherein determining the coincidence count associated with the first flow identifier further comprises:
   summing the match values associated with the other flow identifiers.

7. The method of claim 1, wherein determining the coincidence count associated with the first flow identifier comprises:
   determining the number of matches of the first flow identifier to the other flow identifiers by summing a number of matches identified by comparing the first flow identifier and each of the plurality of other flow identifiers.

8. The method of claim 1, wherein updating the coincidence count table for the first flow identifier comprises:
   when an entry exists in the coincidence count table for the first flow identifier, adding the coincidence count to an existing coincidence count total included in the existing entry for the first flow identifier.

9. The method of claim 1, wherein updating the coincidence count table for the first flow identifier comprises:
   determining whether the first flow identifier exists in the coincidence count table; and
   when the first flow identifier does not exist in the coincidence count table, adding a new entry to the coincidence count table, wherein the new entry comprises an association between the first flow identifier and the coincidence count; and
   when the first flow identifier does exist in the coincidence count table, updating a existing entry in the coincidence count table associated with the first flow identifier by adding the coincidence count to an existing coincidence count total included in the existing entry for the first flow identifier.

10. The method of claim 1, further comprising:
    determining at least one traffic flow statistic using the coincidence count table.

11. An apparatus for determining a coincidence count total associated with one of a plurality of traffic flows, comprising:
    a processor configured for:
       receiving a first packet having a first flow identifier associated with one of the traffic flows;
       comparing the first flow identifier of the first packet to each of a plurality of other flow identifiers which are determined from a respective plurality of other packets;
       determining a coincidence count associated with the first flow identifier based on the comparison of the first flow identifier to each of the plurality of other flow identifiers, wherein the coincidence count is a number of matches of the first flow identifier to the other flow identifiers; and
       updating a coincidence count table for the first flow identifier using the coincidence count.

12. The apparatus of claim 11, wherein each of the plurality of other packets is received prior to the first packet.

13. The apparatus of claim 12, further comprising:
    a memory configured for storing the plurality of packets, wherein the first packet is stored in the memory by replacing one of the plurality of other packets with the first packet, wherein the replaced one of the plurality of other packets is the one of the plurality of other packets having an earliest receipt time.

14. The apparatus of claim 11, wherein comparing comprises:
    selecting each of other flow identifiers; and comparing the first flow identifier to each of the selected other flow identifiers.

15. The apparatus of claim 14, wherein determining the coincidence count associated with the first flow identifier comprises:

setting, for each of the other flow identifiers selected for comparison with the first flow identifier, a match value associated with the other flow identifier, wherein:

in response to a determination that the first flow identifier matches the other flow identifier, the associated match value is set to one; and in response to a determination that the first flow identifier does not match the other flow identifier, the associated match value is set to zero.

16. The apparatus of claim 15, wherein determining the coincidence count associated with the first flow identifier further comprises:

summing the match values associated with the other flow identifiers.

17. The apparatus of claim 11, wherein determining the coincidence count associated with the first flow identifier comprises:

determining the number of matches of the first flow identifier to the other flow identifiers by summing a number of matches identified by comparing the first flow identifier and each of the plurality of other flow identifiers.

18. The apparatus of claim 11, wherein updating the coincidence count table for the first flow identifier comprises:

when an entry exists in the coincidence count table for the first flow identifier, adding the coincidence count to an existing coincidence count total included in the existing entry for the first flow identifier.

19. The apparatus of claim 11, wherein the means for updating the coincidence count table for the first flow identifier comprises:

determining whether the first flow identifier exists in the coincidence count table; and when the first flow identifier does not exist in the coincidence count table, adding a new entry to the coincidence count table, wherein the new entry comprises an association between the first flow identifier and the coincidence count; and when the first flow identifier does exist in the coincidence count table, updating a existing entry in the coincidence count table associated with the first flow identifier by adding the coincidence count to an existing coincidence count total included in the existing entry for the first flow identifier.

20. A method for updating a coincidence count of a traffic flow at a node, comprising:

using a processor for:

comparing a flow identifier which is determined from a received packet to each of a plurality of flow identifiers which are determined from a respective plurality of previously received packets for identifying matches therebetween;

determining a number of matches identified from comparing the flow identifier which is determined from the received packet to each of the flow identifiers which are determined from the previously received packets; and determining a coincidence count for the traffic flow as a sum of the number of identified matches.

* * * * *